US010029766B2

(12) United States Patent
Peden et al.

(10) Patent No.: US 10,029,766 B2
(45) Date of Patent: Jul. 24, 2018

(54) HITCHING A FISH UP TO A TOWED SONAR

(71) Applicant: THALES, Courbevoie (FR)

(72) Inventors: Benoît Peden, Brest (FR); François Cadalen, Brest (FR); Jean-Philippe Longuet, Brest (FR); Mathieu Bodilis, Brest (FR); Pierre Hofmann, Brest (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/518,465

(22) PCT Filed: Oct. 13, 2015

(86) PCT No.: PCT/EP2015/073686
§ 371 (c)(1),
(2) Date: Apr. 11, 2017

(87) PCT Pub. No.: WO2016/059056
PCT Pub. Date: Apr. 21, 2016

(65) Prior Publication Data
US 2017/0233041 A1  Aug. 17, 2017

(30) Foreign Application Priority Data
Oct. 14, 2014 (FR) .................... 14 02310

(51) Int. Cl.
B63B 21/66 (2006.01)
B63G 8/39 (2006.01)
G01V 1/38 (2006.01)

(52) U.S. Cl.
CPC ............. *B63B 21/66* (2013.01); *B63G 8/39* (2013.01); *G01V 1/3843* (2013.01); *B63B 2021/666* (2013.01)

(58) Field of Classification Search
CPC ..... B63B 21/66; B63B 2021/666; B63G 8/39; G01V 1/3843
USPC ........................................ 114/242, 244, 249
See application file for complete search history.

(56) References Cited

U.S. PATENT DOCUMENTS 7,316,269 B1 * 1/2008 Moretz ................. E21B 33/072
  166/385
8,104,419 B2 * 1/2012 Coupeaud ............... B63B 21/66
  114/253

FOREIGN PATENT DOCUMENTS

WO       02/079806 A1   10/2002
WO   2008/043823 A1    4/2008
WO   2014/093975 A1    6/2014

* cited by examiner

*Primary Examiner* — Anthony D Wiest
(74) *Attorney, Agent, or Firm* — Baker & Hostetler LLP

(57) ABSTRACT

An active towed sonar comprises an emission antenna integrated into a submersible object called a towfish, a submersible receive antenna called a streamer and a tow cable to tow the towfish and the streamer. The tow cable comprises a termination connected mechanically and electrically to the streamer. The termination comprises means of removable mechanical and electrical connection of the towfish to the tow cable, independently of the connection of the streamer.

14 Claims, 7 Drawing Sheets

HITCHING A FISH UP TO A TOWED SONAR

CROSS-REFERENCE TO RELATED APPLICATIONS

This application is a National Stage of International patent application PCT/EP2015/073686, filed on Oct. 13, 2015, which claims priority to foreign French patent application No. FR 1402310, filed on Oct. 14, 2014, the disclosures of which are incorporated by reference in their entirety.

FIELD OF THE INVENTION

The invention relates to an active towed sonar comprising an emission antenna integrated into a submersible object called a towfish, and to a, for example linear, submersible receive antenna called a streamer. When the sonar is being used in dependent towing, the towfish and the streamer are connected in succession to one and the same tow cable. FIG. 1 illustrates a known configuration of an active sonar in dependent towing. The deck of the ship 10 is equipped with a towing device comprising a motorized winch 11 capable, via a fairlead 15, of towing a cable 12 (often called heavy cable) to which there are connected, on the one hand, a towfish 13 and, on the other hand, a streamer 14. A light tow cable 16 may be interposed between the towfish and the streamer 14.

BACKGROUND

Launching this assembly into the water is a tricky operation. In general, the streamer 14 and the light cable 16 are first of all launched into the water using an ancillary winch (not depicted). Once this initial launch has been performed, the towfish 13 is connected to the light cable 16 and the main cable 12 is in turn connected to the towfish 13. The connections provide mechanical and electrical connection of the various subassemblies. Once these connections have been made, the rest of the launch procedure can be performed by means of the winch 11 in order to arrive at the configuration depicted in FIG. 1. The assembly is recovered by reversing the launch operations.

This procedure exhibits a number of deficiencies.

Mechanical and electrical continuity between the cable 12 and the streamer 14 is achieved through the towfish. If the sonar is to be operated in passive mode, which means to say with no acoustic emission on the part of the towfish, then it is still necessary to launch the towfish 13. This is because it is actually impossible to connect the streamer 14 to the main cable 12, potentially by way of the light cable 16 without passing via the towfish 13.

The mechanical and electrical connections are made in a hostile environment with a risk of corrosion due to the marine environment and with the personnel doing the manipulation exposed for a lengthy period to the swell.

If certain handling elements break, for example the ancillary winch, there is a risk of losing the streamer 14, or even the towfish 13.

The invention seeks to alleviate all or some of the problems mentioned above by eliminating the need for an ancillary winch and by proposing a sonar system in which the mechanical connections are premade and in which the fitting of the towfish is optional.

SUMMARY OF THE INVENTION

To this end, the subject of the invention is an active towed sonar comprising an emission antenna integrated into a submersible object called a towfish, a submersible receive antenna called a streamer and a tow cable intended to tow the towfish and the streamer, characterized in that the tow cable comprises a termination connected mechanically and electrically to the streamer, and in that the termination comprises means of removable mechanical and electrical connection of the towfish to the tow cable, independently of the connection of the streamer.

The termination comprises several vertebrae articulated to one another in series, the vertebrae having a substantially cylindrical exterior surface extending along a main axis X of the tow cable when the tow cable is taut.

A first and a second of the vertebrae may be intended each to collaborate with a fork of the towfish so as to ensure the mechanical connection of the towfish to the termination.

A third of the vertebrae may comprise at least one electrical fixed connector allowing the towfish to be connected to the tow cable. The towfish then comprises an arm terminating in one of the forks. An electrical cable allowing electrical connection of the towfish extends inside the arm. The electrical cable comprises a free portion extending outside the arm and ending in a plug intended to be connected to the fixed connector.

The vertebrae referred to as the running vertebrae situated between the first vertebra and the third vertebra advantageously comprise a slot oriented along the axis X and produced inside the cylindrical exterior surface of the running vertebrae concerned. The slot is intended to contain the free portion of the electrical cable.

The sonar may comprise a removable electrical extension arranged between the plug forming the end of the electrical cable and the fixed connector. The electrical extension is arranged inside the cylindrical exterior surface of the third vertebra.

The fork advantageously comprises two tines. The first and the second vertebrae comprise slots, it being possible for the tines each to become inserted in one of the slots.

Advantageously, the slots pass through the vertebra concerned along a vertical axis Z perpendicular to the axis X.

The slots may have an entry bevel making it easier to insert the fork in the vertebra concerned.

The fork may be articulated with respect to the towfish in such a way as to allow the fork to rotate about a horizontal axis Y perpendicular to the axis X.

The fork may have a shape that curves perpendicular to the axis Y.

The shape of the fork is advantageously curved such that a concave part of the curved shape comes to bear against a first flank of the corresponding slot and such that a free end of each of the tines comes to bear against a second flank of the corresponding slot, opposite to the first flank.

The first and second vertebrae and the forks are advantageously pierced in such a way as to allow the passage of a rod allowing the fork to be locked in position on the corresponding vertebra.

The sonar may comprise a pin making it possible to prevent the disengagement of the rod that locks the fork.

The mechanical connection may ensure the positioning of the towfish with respect to the termination, keeps it in position and reacts the forces applied by the towfish to the termination.

BRIEF DESCRIPTION OF THE DRAWINGS

The invention will be better understood and further advantages will become apparent from reading the detailed description of one embodiment given by way of example, which description is illustrated by the attached drawing in which.

For the sake of clarity, the same elements will bear the same references in the various figures.

DETAILED DESCRIPTION

Figure 1:
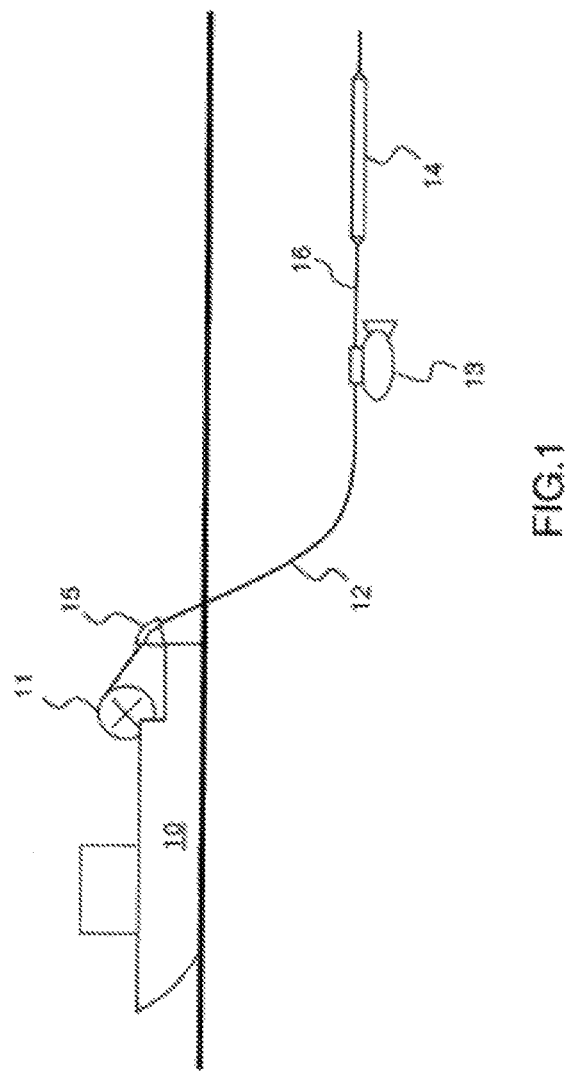
FIG. 1, already introduced, illustrates the overall structure of an active towed sonar.
Figure 2:
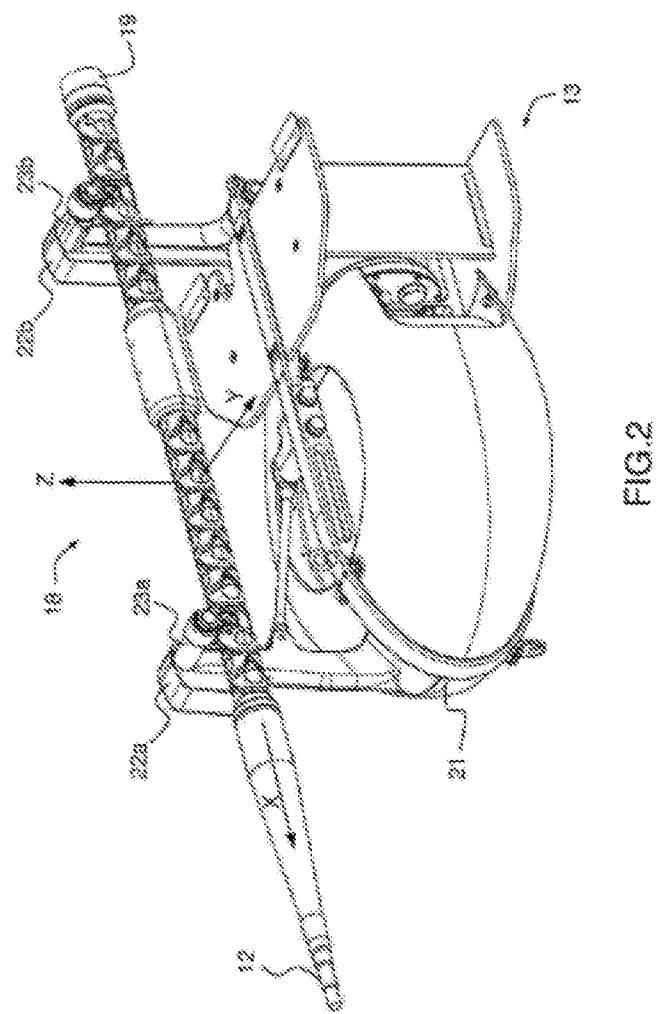
FIG. 2 depicts a first embodiment of how a towfish is attached to a tow cable.

FIG. 2 depicts a termination 18 of a tow cable 12 from which there is suspended a towfish 13 comprising a submersible body 21, intended to receive within its structure an emission antenna of an active sonar. The streamer 14 may be connected to the free end 19 of the termination directly or via the light tow cable 16.

The towfish 13 is suspended from the tow cable 12 by two asymmetric connecting arms 22a and 22b allowing the connecting arms to pass laterally through the fairlead 15.

The tow cable 12 is intended to tow the towfish 13. The cable 12 extends along a towing axis X that is substantially horizontal when the towfish 13 is being towed. The towfish 13 is suspended from the cable 12 under the effect of its weight. An axis Z is defined perpendicular to the axis of the cable 12. A final axis Y is defined that is perpendicular to the other axes X and Z. The axes X, Y and Z are defined with respect to the cable 12. By convention it will be assumed hereinafter that the axes X and Y are horizontal and that the axis Z is vertical. The horizontality of the axis X and the verticality of the axis Z come into effect only when the towfish 13 is suspended under gravity and is stable. The axis X is the towing axis. In practice, the axis X may adopt an inclined position which may be as much as 40° to 60° on launch or recovery of the towfish 13. The axis X may also veer to starboard or to port in turns. The axis X may be called the roll axis, the axis Y the pitch axis and the axis Z the yaw axis.

Figure 3:
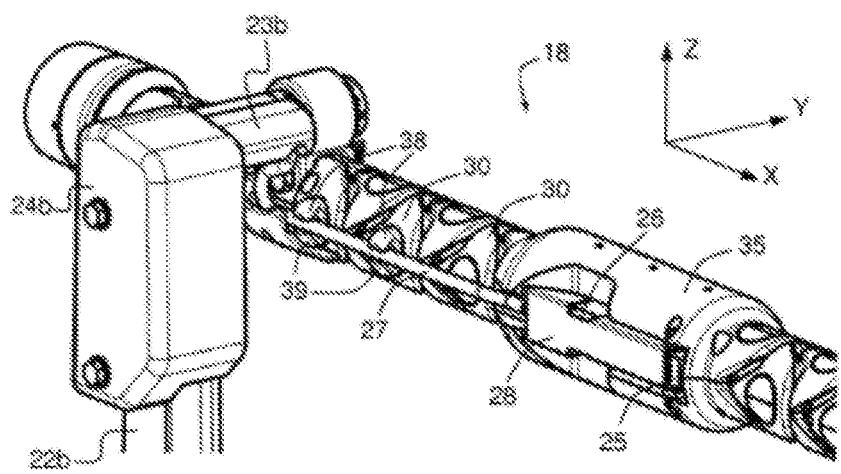
FIG. 3 depicts in greater detail the connection between the towfish and a termination that forms one end of the tow cable.

FIG. 3 depicts in greater detail the connection between the towfish 13 and the termination 18. More specifically, it is possible to distinguish the mechanical connection at the arm 22b. The arm extends along the axis Z from the towfish 13. A finger 23b is fixed at an upper end 24b of the arm 22b. The finger 23b extends along the axis Y. The finger 23b covers the termination 18 to be attached thereto. The mechanical fixing will be detailed later on. The arm 22a is mechanically identical to the arm 22b.

The towfish 13 is electrically connected to the tow cable 12 by means of an electrical fixed connector 25 belonging to the termination 18 and of an electrical plug 26 arranged at the end of an electrical cable 27 emerging from the towfish 13. The cable 27 extends along inside the arm 22b and the finger 23b. The electrical cable 27 comprises a free portion extending outside the finger 23b and terminating in the plug 26 intended to be connected to the fixed connector 25. A cap 28 advantageously covers the plug 26 and the fixed connector 25 in order to afford them mechanical protection.

Figure 4:
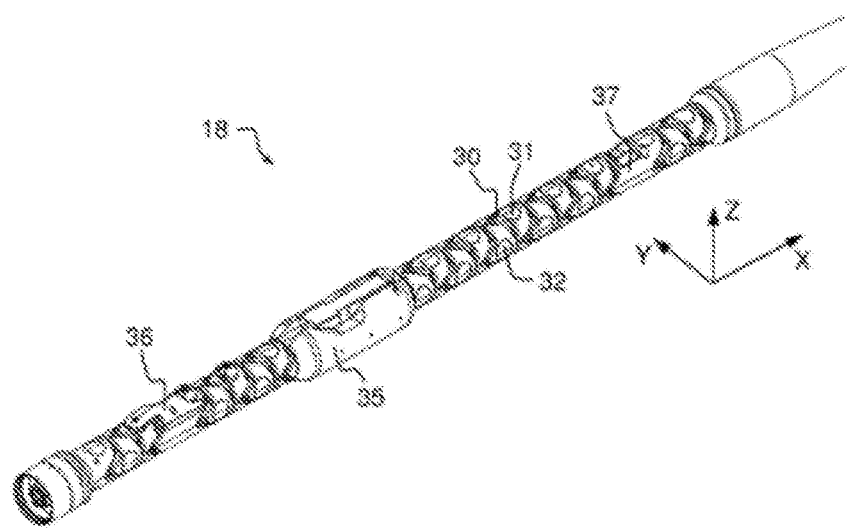
FIG. 4 depicts the termination alone without the towfish.

FIG. 4 depicts the termination 18 alone without the towfish 13. The termination 18 is formed of several vertebrae articulated together in series. One running vertebra 30 is articulated to the previous one by means of a pivot connection 31 allowing freedom of rotation about the axis Z. The same vertebra 30 is articulated to the next one by means of a pivot connection 32 allowing freedom of rotation about the axis Y.

When the tow cable 12 is taut, the various vertebrae of the termination 18 are aligned along the axis X. In this configuration, the exterior surface of the running vertebrae 30 forms a substantially cylindrical surface of axis X so as to minimize the drag in the water. The pivot connections 31 and 32 are contained within the cylindrical surface.

The termination 18 comprises three special vertebrae. One vertebra 35 comprises the fixed connector 25 that allows the towfish 13 to be electrically connected to the cable 12. More specifically, the cable 12 is formed of a core along which the electrical or possibly optical conductors run, making it possible to carry signals and power between the winch 11 and the towfish 13 and between the winch 11 and the streamer 14. The cable 12 is covered by an armature that provides its mechanical integrity. The conductors also run along inside the vertebrae and those intended for connecting the towfish 13 emerge from the termination 18 via the fixed connector 25. The vertebra 35 comprises a cylindrical exterior surface of axis X. Once the electrical connection of the towfish 13 has been made, the fixed connector 25, the plug 26 and the cap 28 do not protrude from the cylindrical exterior surface of the vertebra 35. In this alternative form, in order to allow the fitting of the fixed connector 25, the outside diameter of the exterior surface of the vertebra 35 is greater than the diameter of the exterior cylindrical surface of the running vertebrae 30.

Two other special vertebrae 36 and 37, advantageously identical, allow mechanical connection of the towfish 13 to the termination 18. The mechanical connection ensures the positioning of the towfish 13 with respect to the termination 18, keeps it in position and reacts the forces applied by the towfish 13 to the termination 18. Included among the forces applied by the towfish 13 to the termination 18 are mainly the weight of the towfish and the hydrodynamic forces applied by the water to the towfish 13 when the latter is being towed. It is possible to have, in succession, a vertebra 36, several running vertebrae 30, the vertebra 35, several running vertebrae 30, the vertebra 37 and, once again, several running vertebrae 30 to form the termination 18.

The running vertebrae 30 situated between the vertebra 36 to which the arm 22b is fixed and the vertebra 35 may comprise lugs 38 and 39 for holding the electrical cable 27 in position along the exterior surface of the vertebrae 30. It is also possible to provide lugs on the vertebrae 30 situated between the vertebra 35 and the vertebra 37 in order to accommodate an electrical cable coming from the arm 22a. The vertebra 35 may be symmetric so that a cable coming from the arm 22a or from the arm 22b can be connected to it. It is possible to foresee a towfish 13 equipped with two electrical cables, one passing through each of the arms 22a and 22b. For that reason, the vertebra 35 comprises two fixed connectors 25, each intended to accept one of the cables.

Figure 5A:
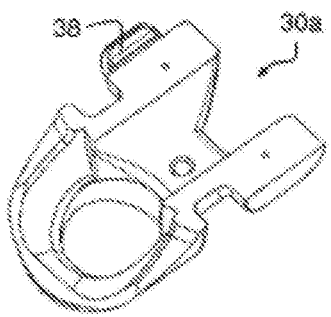
FIGS. 5a and 5b depict two half-vertebrae of the termination, these being equipped with means of retaining an electrical cable coming from the towfish.
Figure 5B:
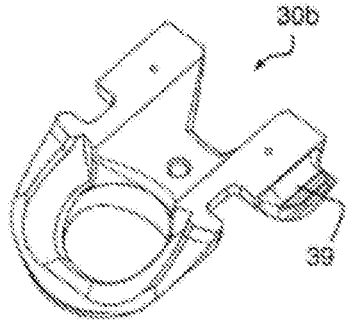
Figure 6A:
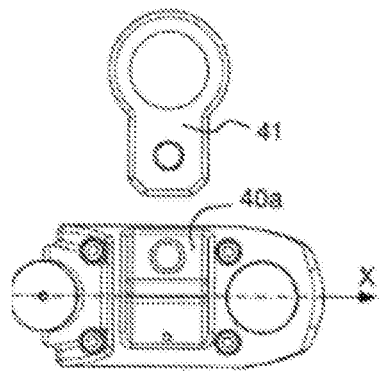
FIGS. 6a, 6b, 6c and 6d depict, in the case of the first embodiment, an example of the mechanical retention of the towfish on the termination.
Figure 6B:
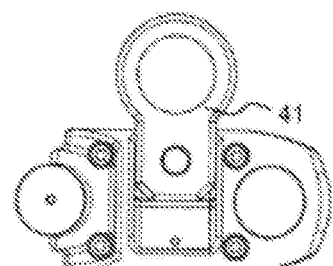
Figure 6C:
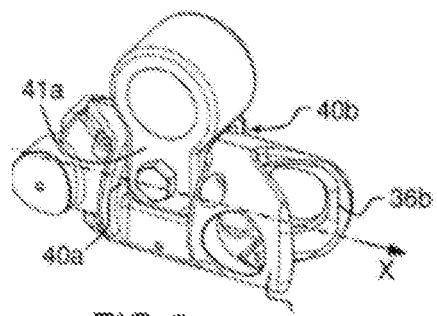
Figure 6D:
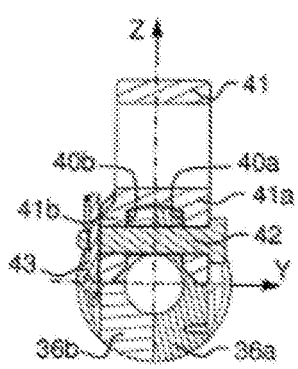

In order to assemble the vertebrae 30 and notably to assemble the pivot connections 31 and 32, the running vertebrae 30 are formed of two half-vertebrae 30a and 30b each. FIGS. 5a and 5b depict two half-vertebrae 30a and 30b each equipped with a lug 38 and 39 respectively.

FIGS. 6a, 6b, 6c and 6d depict an example of mechanical attachment of a finger to the vertebra intended to receive same, in this instance the finger 23b on the vertebra 36. The finger 23a is advantageously fixed to the vertebra 37 in the same way.

The vertebra 36 is formed of two half-vertebrae 36a and 36b. Once assembled against one another, the two half-vertebrae have an exterior surface that is substantially cylindrical of axis X, of the same diameter as that of the exterior surface of the running vertebrae 30.

Each half-vertebra 36a and 36b comprises a slot 40a and 40b respectively, recessed into the exterior cylindrical surface and extending along the axis Z. After the vertebra 36 has been assembled, the two slots are symmetrical about a vertical plane passing through the axes X and Z.

The finger 23b terminates in a fork 41 intended to collaborate with the two slots 40a and 40b. The fork 41 comprises two tines 41a and 41b each intended to enter one of the slots 40a and 40b respectively. The interior dimensions of the slots 40a and 40b are substantially equal, to within a functional tolerance, to the exterior dimensions of the tines 41a and 41b so that the tines 41a and 41b slide in the slots 40a and 40b in a translational movement along the axis Z during the mechanical connection of the towfish 13 to the termination 18. The two half-vertebrae 36a and 36b as well as the fork 41 are pierced so as to allow the passage of a rod 42 that allows the position of the fork 41 on the vertebra 36 to be locked. A pin 43 may prevent the rod 42 from disengaging.

Figure 7:
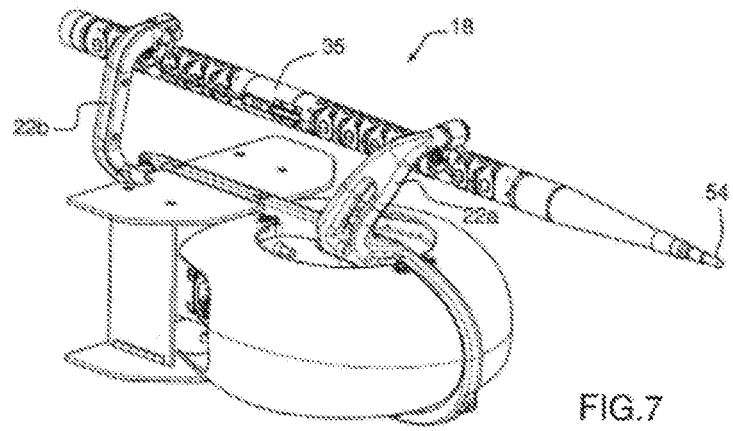
FIG. 7 depicts a second embodiment of the attachment of the towfish to the tow cable.

FIG. 7 depicts a second embodiment of the termination 18, in which all the vertebrae have a cylindrical surface with the same diameter. More specifically, in the embodiment visible in FIGS. 3 and 4, the vertebra 35 has a diameter greater than that of the other vertebrae. This change in diameter generates additional drag in the water when the sonar is being towed. During launch or recovery, the change in diameter may also give rise to jolts and knocks, notably as the termination 18 passes through the fairlead 15. In the embodiment of FIG. 7, this change in diameter is eliminated.

In addition, in the embodiment visible in FIGS. 3 and 4 the lugs 38 and 39 protrude relative to the cylindrical exterior surface of the running vertebrae 30. This protrusion has been eliminated in the embodiment of FIG. 7 and the free portion of the electrical cable 27 is arranged inside the cylindrical exterior surface of the running vertebrae 30 from where it exits the finger 23b as far as the vertebra 35. For this purpose the running vertebrae 30 situated between the vertebrae 35 and 36 comprise a slot 45 oriented along the axis X and created inside the cylindrical exterior surface of the running vertebrae 30 concerned. The slot 45 is intended to contain the electrical cable 27. The slot may grip the electrical cable 27 slightly so that it remains in the slot 45 when the various vertebrae move relative to one another at their pivot connections. Inside the slot 45, the electrical cable 27 may nevertheless move along the axis X so as to conform to the movement of the vertebrae 30 relative to one another as they move relative to one another by means of their pivot connections. This movement makes it possible to avoid premature wearing of the electrical cable 27 through pulling thereof along the axis X.

Figure 8:
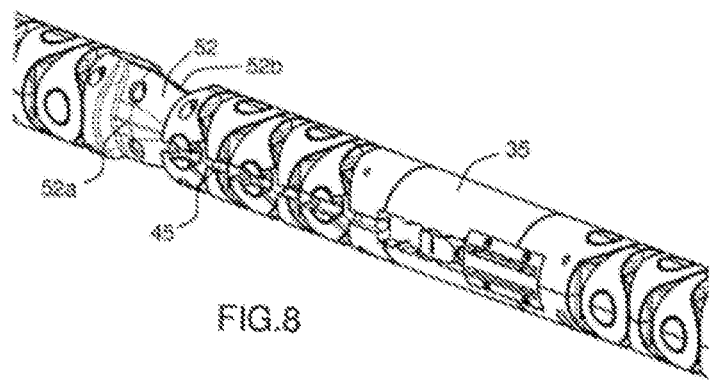
FIGS. 8 and 9 depict in greater detail part of the termination of the second embodiment.
Figure 9:
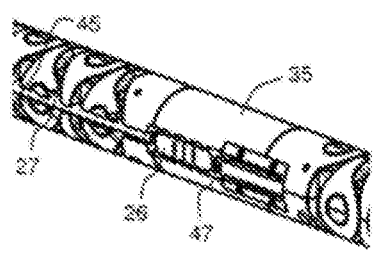

FIG. 8 depicts in greater detail a part of the termination 18 at the level of the slot 45. FIG. 9 depicts this same part with the electrical connection of the electrical cable 27 made. Advantageously, a removable electrical extension 47 is arranged between the plug 26 that forms the end of the electrical cable 27 and the fixed connector 25. The fitting and removal of the towfish 13 with respect to the termination 18 are performed electrically between the plug 26 and the extension 47. In this way, the fixed connector 25 is not handled. The electrical extension 47 constitutes a wearing component that can easily be replaced. This wearing component limits the risk of damage to the fixed connector 25 during handling of the towfish 13. The electrical extension 47 is arranged inside the cylindrical exterior surface of the vertebra 35.

FIGS. 10a to 10j depict, for the second embodiment, how the towfish 13 is mechanically retained on the termination 18. The fingers 23a and 23b terminate in forks 50 which differ from the forks 41. FIGS. 10a to 10j depict just one fork 50 facing a vertebra 52 intended to accept it. The two forks 50 on either side of the two vertebrae intended to accept the forks 50 are advantageously identical. The vertebra 52 differs from the vertebra 36 in terms of the shape of its slots 52a and 52b into which the fork 50 is inserted.

Figure 10A:
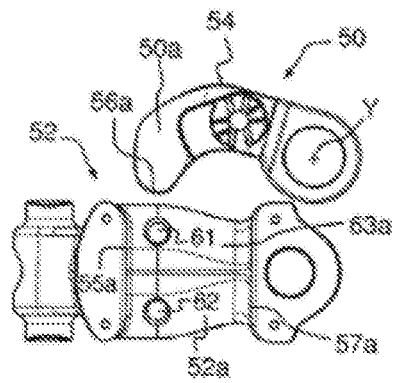
FIGS. 10a to 10j depict, in the case of the second embodiment, an example of the mechanical retention of the towfish on the termination.
Figure 10B:
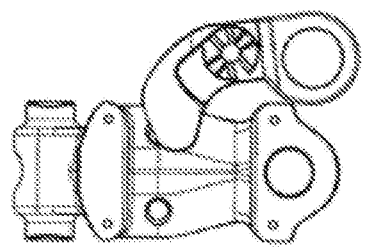

The fork 50 is articulated with respect to the finger 23b so as to allow the fork 50 to rotate about a horizontal axis Y. FIGS. 10a to 10g depict various positions of the fork 50 with respect to the vertebra 52. This articulation allows the fork 50 to slide along the axis X on the various vertebrae of the termination 18 without the risk of damaging the fork 50. It is possible to foresee, during the maneuver of attaching the towfish 13, keeping the towfish 13 fixed on the deck of the ship 10. Bringing the cable 12 closer to its position in which the towfish 13 is attached, is achieved chiefly by operating the winch 11. In the first embodiment it is possible to foresee a pivot connection about the axis Y between the fork 41 and the finger that bears it. This pivot connection has a small amplitude of movement and allows the tines 41a and 41b to rotate to make them easier to insert into the corresponding slots. More specifically, in the second embodiment, when the towfish 13 is being fitted onto the termination, the arms 22a and 22b can be positioned on the cable 12 upstream of the termination 18, namely on a part 54 of the cable 12. The operator fitting the towfish 13 then operates the winch 11 in such a way as to wind in the cable 12 in order to bring the arms 22a and 22b closer to their respective host vertebra. As long as the forks 50 do not reach the host vertebrae, they remain in the retracted position as depicted in FIG. 10a. As the operator continues to operate the winch 11, the slots 52a and 52b of the vertebra 52 come to face the fork 50 which can rotate freely about its pivot connection and insert itself under gravity into the corresponding slots. Alternatively, the operator may engage the forks 50 in their respective vertebra 52 by hand. This operation marks the transition from the position of FIG. 10a to that of FIG. 10c.

Figure 10C:
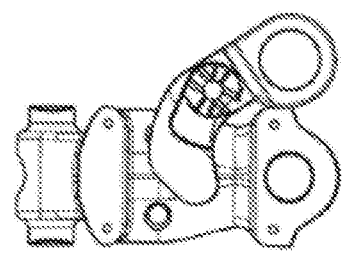
Figure 10D:
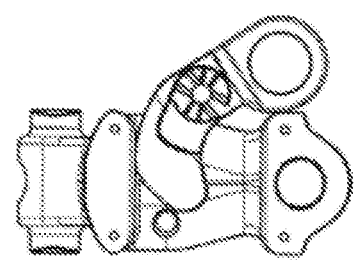
Figure 10E:
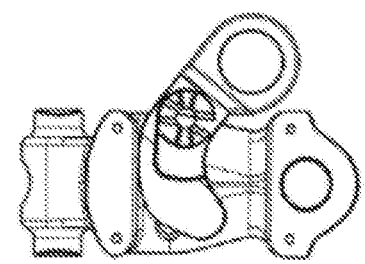
Figure 10F:
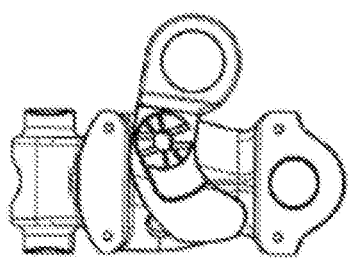
Figure 10G:
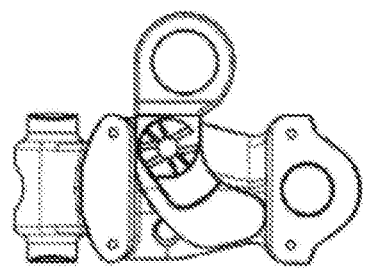
Figure 10H:
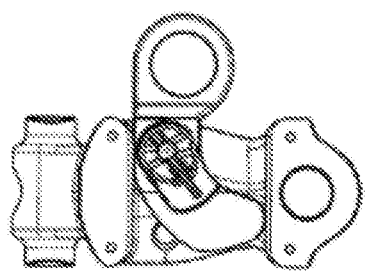
Figure 10I:
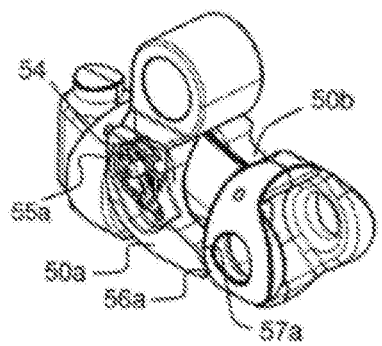
Figure 10J:
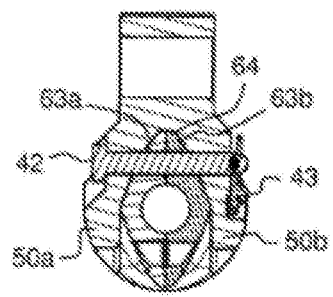

The operator then resumes operation of the winch 11 in order to move on from the position of FIG. 10c to that of FIG. 10g.

The slots 52a and 52b differ from the slots 40a and 40b in terms of their width defined along the axis X so as to allow the fork 50 to rotate inside the corresponding slots.

To make it easier to fit the fork 50 into the slots 52a and 52b, the fork 50 has a shape that curves perpendicular to the axis Y. More specifically, the fork 50 comprises two tines 50a and 50b each able to become inserted in one of the slots 52a and 52b respectively. The shape of the fork 50 is curved so that a concave part 54 of the curved shape comes to bear against one of the flanks 55a and 55b of the corresponding slot 52a and 52b. The free end 56a and 56b of each of the tines 50a and 50b comes to bear against a flank 57a and 57b of the corresponding slot, opposite to the flank 55a, 55b.

In the position of FIG. 10g, the forks 50 are in abutment on the corresponding vertebrae 52. The rod 42 and the pin 43 can then be used as before to lock the position of the fork 50 on the vertebra 52. After locking, the towfish 13 can be launched into the water by operating the winch 11, use of the sonar then follows.

At the end of the mission, the sonar is brought back on board the deck of the ship 10 using the winch 11. When the towfish 13, towed by the cable 12, arrives on the deck of the ship 10, the towfish 13 is immobilized on the deck and the operation of detaching the towfish may be begun.

Detaching the towfish 13 from the termination 18 is performed by reversing the order of the attachment operations. More specifically, the removal of the rod 42 is performed in the position of FIG. 10h toward that of FIG. 10g. The operator then operates the winch 11 to move the termination 18 with respect to the towfish 13 in order to move on from the position of FIG. 10g to the position of FIG. 10c. The operator then manually lifts the fork 50 to move the tines 50a and 50b away from the corresponding vertebra. The cable 12 can then be taken away from the towfish 13 and continue to be wound in.

The slots 52a and 52b may be passed through the vertebra 52 along the axis Z. Thus, the termination 18 may be inverted by 180° about the axis X and still accept the insertion of the fork 50. The fact that the slots are through-slots may also apply to the first embodiment.

The various FIGS. 10a to 10j show two holes 61 and 62 able to accept the rod 42. One or other of the two holes is used according to the orientation of the termination 18 with respect to the towfish 13.

In addition, to make the insertion of the fork 50 easier, the slots 52a and 52b each have an entry bevel 63a and 63b respectively. This bevel allows a tolerance on the rotational positioning of the termination about the axis X with respect to the fork 50. The bottom 64 of the fork 50 may have a hollowed shape conforming to that of the bevels 63a, 63b so as to immobilize the fork 50 in terms of rotation about the axis X when the fork is fully inserted into the slots 52a and 52b. The bevel may also apply to the first embodiment.

In addition, when insertion of the fork 50 is complete, the tines 50a and 50b are arranged inside the exterior cylindrical surface of the vertebra 52.

The invention claimed is:

1. An active towed sonar comprising an emission antenna integrated into a submersible object called a towfish, a submersible receive antenna called a streamer and a tow cable intended to tow the towfish and the streamer, wherein the tow cable comprises a termination connected mechanically and electrically to the streamer, wherein the termination comprises means of removable mechanical and electrical connection of the towfish to the tow cable, independently of the connection of the streamer and wherein the termination comprises several vertebrae articulated to one another in series, the vertebrae having a substantially cylindrical exterior surface extending along a main axis X of the tow cable when the tow cable is taut.

2. The sonar as claimed in claim 1, wherein a first and a second of the vertebrae are intended each to collaborate with a fork of the towfish so as to ensure the mechanical connection of the towfish to the termination.

3. The sonar as claimed in claim 2, wherein a third of the vertebrae comprises at least one electrical fixed connector allowing the towfish to be connected to the tow cable, wherein the towfish comprises an arm terminating in one of the forks, wherein an electrical cable allowing electrical connection of the towfish extends inside the arm and wherein the electrical cable comprises a free portion extending outside the arm and ending in a plug intended to be connected to the fixed connector.

4. The sonar as claimed in claim 3, wherein the vertebrae referred to as the running vertebrae situated between the first vertebra and the third vertebra comprise a slot oriented along the axis X and produced inside the cylindrical exterior surface of the running vertebrae concerned and wherein the slot is intended to contain the free portion of the electrical cable.

5. The sonar as claimed in claim 4, comprising a removable electrical extension arranged between the plug forming the end of the electrical cable and the fixed connector and wherein the electrical extension is arranged inside the cylindrical exterior surface of the third vertebra.

6. The sonar as claimed in claim 2, wherein the fork comprises two tines, wherein the first and the second vertebra comprise slots, it being possible for the tines each to become inserted in one of the slots.

7. The sonar as claimed in claim 6, wherein the slots pass through the vertebra concerned along a vertical axis Z perpendicular to the axis X.

8. The sonar as claimed in claim 6, wherein the slots have an entry bevel making it easier to insert the fork in the vertebra concerned.

9. The sonar as claimed in claim 6, wherein the first and second vertebrae and the forks are pierced in such a way as to allow the passage of a rod allowing the fork to be locked in position on the corresponding vertebra.

10. The sonar as claimed in claim 9, comprising a pin making it possible to prevent the disengagement of the rod that locks the fork.

11. The sonar as claimed in claim 2, wherein the fork is articulated with respect to the towfish in such a way as to allow the fork to rotate about a horizontal axis Y perpendicular to the axis X.

12. The sonar as claimed in claim 11, wherein the fork has a shape that curves perpendicular to the axis Y.

13. The sonar as claimed in claim 12, wherein the shape of the fork is curved such that a concave part of the curved shape comes to bear against a first flank of the corresponding slot and wherein a free end of each of the tines comes to bear against a second flank of the corresponding slot, opposite to the first flank.

14. The sonar as claimed in claim 1, wherein the mechanical connection ensures the positioning of the towfish with respect to the termination, keeps it in position and reacts the forces applied by the towfish to the termination.

* * * * *